United States Patent
Azuma (10) Patent No.: US 8,434,580 B2
(45) Date of Patent: May 7, 2013

(54) UTILITY VEHICLE WITH AIR-INTAKE APPARATUS FOR ENGINE

(75) Inventor: Shinjiro Azuma, Kako-gun (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 225 days.

(21) Appl. No.: 12/974,300

(22) Filed: Dec. 21, 2010

(65) Prior Publication Data

US 2012/0152632 A1  Jun. 21, 2012

(51) Int. Cl.
*B60K 13/02* (2006.01)

(52) U.S. Cl.
USPC .......................................... 180/68.3; 180/291

(58) Field of Classification Search .................. 180/68.1, 180/68.2, 68.3, 68.4, 68.6, 291; 296/193.09
See application file for complete search history.

(56) References Cited

U.S. PATENT DOCUMENTS

| 4,878,555 | A | * | 11/1989 | Yasunaga et al. | 180/68.3 |
| 5,034,036 | A | * | 7/1991 | Creek et al. | 55/385.3 |
| 7,234,555 | B2 | * | 6/2007 | Khouw et al. | 180/68.3 |
| 7,314,107 | B2 | * | 1/2008 | Nakagome et al. | 180/68.3 |
| 7,410,025 | B2 | * | 8/2008 | Sunaguchi et al. | 180/229 |
| 2008/0015065 | A1 | * | 1/2008 | Kato et al. | 474/8 |
| 2010/0187032 | A1 | * | 7/2010 | Yamamura et al. | 180/68.2 |

FOREIGN PATENT DOCUMENTS

JP  62-205822  9/1987

* cited by examiner

*Primary Examiner* — Frank Vanaman
(74) *Attorney, Agent, or Firm* — Wenderoth, Lind & Ponack, L.L.P.

(57) ABSTRACT

A utility vehicle with an air-intake apparatus for an engine. The air-intake apparatus includes an air-intake duct connected to the engine, the air-intake duct extending in a bonnet chamber, and an air cleaner case connected to an air-intake upstream portion of the air-intake duct. The air cleaner case accommodates a tubular filter element. The air cleaner case is arranged so as to be inclined in the bonnet chamber so that a central axis of the filter element is inclined forward.

8 Claims, 9 Drawing Sheets

UTILITY VEHICLE WITH AIR-INTAKE APPARATUS FOR ENGINE

BACKGROUND OF THE INVENTION

1. Field of the Invention

The present invention relates to a utility vehicle with an air-intake apparatus for an engine for supplying combustion air to the engine, mainly to a utility vehicle suitable for running on irregular terrain.

2. Description of the Related Art

Figure 10:
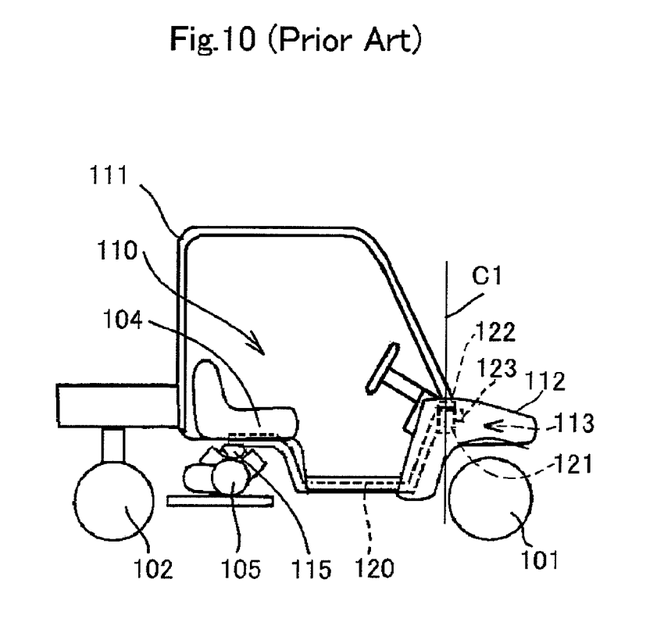
FIG. 10 is a schematic right side view of a conventional example.

FIG. 10 shows one example of a conventional utility vehicle. A vehicle is provided with a cabin 110 surrounded by a cabin frame (ROPS) 111 between a pair of right and left front wheels 101 and a pair of right and left rear wheels 102. A seat 104 is installed in the cabin 110, and an engine 105 is arranged on the lower side of the seat 104. A bonnet 112 is provided on the front side of the cabin 110, and the bonnet 112 covers the upper side of a bonnet chamber 113.

An air-intake apparatus for supplying combustion air to the engine 105 includes an air-intake chamber 115 arranged on the upper side of the engine 105, an air-intake duct 120 connected to the air-intake chamber 115, an air cleaner case 121 connected to the air-intake duct 120, and the like. The air-intake duct 120 extends forward and reaches the interior of the bonnet chamber 113. A front part of the air-intake duct 120 stands up in the bonnet chamber 113, and the air cleaner case 121 is provided in an upper end of the air-intake duct 120. The air cleaner case 121 is arranged so that a central axis or center line C1 of a tubular filter element (not shown) is along the substantially vertical direction. The air cleaner case 121 has an upper lid 122 in an upper end thereof, and has an air taking portion 123 opened forward on a front surface thereof. Related art documents include Unexamined Japanese Patent Publication No. 62-205822.

When the air cleaner case 121 is arranged so that the central axis C1 of the filter element is along the substantially vertical direction as shown in FIG. 10, it is necessary to ensure a fixed space between the upper lid 122 of the air cleaner case 121 and the bonnet 112 in order to perform maintenance of the filter element and the like. Therefore, various components for the vehicle cannot be arranged in an upper space of the air cleaner case 121 and in the vicinity thereof, and a space in the bonnet chamber cannot be effectively utilized.

With the structure having the air cleaner case 121 arranged so that the central axis C1 of the filter element is along the substantially vertical direction, a short person is not able to easily look in the interior of the air cleaner case 121 and is required to detach the filter element for confirmation of the filter element at the time of the maintenance of the filter element and the like. Thus, a maintenance task takes time and effort.

SUMMARY OF THE INVENTION

The present invention is developed in consideration of the above problem, and an object of the present invention is to effectively utilize a space in a bonnet chamber by utilizing an upper space of an air cleaner case arranged in the bonnet chamber for arranging vehicle equipments. One of other objects is to be able to easily perform maintenance of the interior of the air cleaner case. Further, another one of the objects of the present invention is to prevent water and mud from entering the air cleaner case from the exterior.

In order to achieve each object, according to the present invention, a utility vehicle includes a bonnet chamber positioned in a front part of the vehicle and covered with a bonnet; an engine arranged at a rear position of the bonnet chamber; and an air-intake apparatus for supplying combustion air to the engine. The air-intake apparatus includes: an air-intake duct connected to an air-intake portion of the engine, the air-intake duct extending in the bonnet chamber; and an air cleaner case connected to an air-intake upstream portion of the air-intake duct. The air cleaner case accommodates a tubular filter element, and the air cleaner case is arranged so as to be inclined in the bonnet chamber so that a central axis of the filter element is inclined forward.

With the above configuration, the upper space of the air cleaner case in the bonnet chamber and other peripheral spaces can be effectively utilized. Since the air cleaner case is arranged to be inclined, even a short person can easily view the interior of the air cleaner case at the time of opening the bonnet and performing filter element replacement. Thus, the maintenance can be easily performed.

The present invention is preferably provided with the following configurations in the utility vehicle with the above configuration.

(a) The air cleaner case has a case main body having a bottom wall, a peripheral side wall, and an upper lid. An air inlet and an air outlet are formed in the bottom wall.

With the above configuration, a mold for casting the air cleaner case can be easily manufactured. That is, since the air inlet and the air outlet are molded in the same drawing direction, the mold can be simplified and a molding task can be easily performed. A task of connecting the air-intake duct extending from the rear side and the air inlet of the air cleaner case in the bonnet chamber can be easily performed.

(b) The air cleaner case has a case main body having a bottom wall, a peripheral side wall, and an upper lid. The filter element is fixed to the upper lid and attached to the case main body integrally with the upper lid.

With the above configuration, the filter element can be simply placed in the case main body together with the upper lid without fail relative to the inclined air cleaner case. Thus, an attachment task of the filter element can be easily performed.

(c) A component(s) or equipment for the vehicle is located near the air cleaner case, and above and behind the air cleaner case.

With the above configuration, a blank space above the upper side of the inclined air cleaner case can be effectively utilized for arranging the component, so that the component can be compactly arranged in the bonnet chamber.

(d) A battery is arranged under the air cleaner case.

With the above configuration, a blank space under the air cleaner case can be effectively utilized for arranging the battery. Moreover, since the position of the battery can be lowered, the center of gravity of the vehicle itself can be lowered and hence stabilized.

(e) A snorkel extending upward with an upper end thereof opened downward is detachably connected to the air inlet formed in the bottom wall of the air cleaner case.

With the above configuration, mud or water splashed by the wheels or the like from the lower side can be effectively prevented from entering.

(f) The snorkel is preferably opened in a dashboard formed on the rear side of the bonnet chamber by a partition plate.

With the above configuration, mud or water splashed by the wheels or the like from the lower side can be further effectively prevented from entering.

(g) The snorkel is preferably provided with a substantially arc shape attachment support portion on the lower surface of the upper end thereof.

With the above configuration, by fitting the arc shape attachment support portion to a round pipe of a vehicle body frame at the time of attaching the snorkel, the snorkel can be temporarily supported to prevent the snorkel from being dropped. Thereby, an operator does not need to hold the snorkel with his/her hand, and the snorkel can be easily connected to the air inlet of the air cleaner case.

BRIEF DESCRIPTION OF THE DRAWINGS

The objects and characteristics of the present invention will be sufficiently disclosed by the following detailed description based on the attached drawings.

DETAILED DESCRIPTION OF THE INVENTION

FIGS. 1 to 8 show a utility vehicle with an air-intake apparatus for an engine according to a first embodiment of the present invention, particularly a multi-purpose utility vehicle suitable for running on irregular terrain. The present invention will be described based on these figures.

1. Entire Configuration of Utility Vehicle

Figure 1:
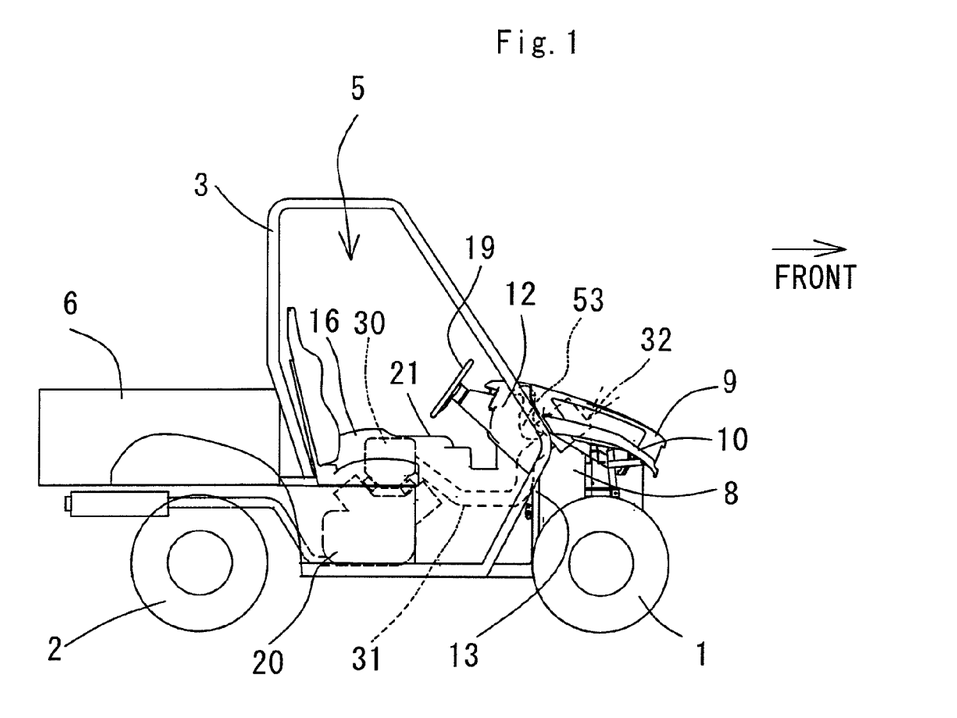
FIG. 1 is a schematic right side view showing a first embodiment of a utility vehicle with an air-intake apparatus for an engine according to the present invention.

In FIG. 1 is a schematic right side view of the utility vehicle, which is provided with a pair of right and left front wheels 1 in a front part thereof, a pair of right and left rear wheels 2 in a rear part thereof, a cabin 5 surrounded by a cabin frame (ROPS) 3 between the front wheels 1 and the rear wheels 2, and a loading platform 6 on the rear side of the cabin 5. The cabin frame 3 is generally called as a ROPS which is an abbreviation of "rollover protective structure". A bonnet chamber (space) 8, surrounded by the right and left front wheels 1 and a bonnet 9 on the upper side, is provided on the front side of the cabin 5. A pair of front fenders 10, covering the upper side of the right and left front wheels 1, is integrally formed in the bonnet 9. The cabin 5 is not provided with a front glass, side doors, a ceiling wall, and the like, and therefore, a front part, right and left side parts, an upper part, and a rear part thereof are open. The bonnet chamber 8 and the cabin 5 are partitioned by a dashboard 12 and a partition plate 13.

Figure 2:
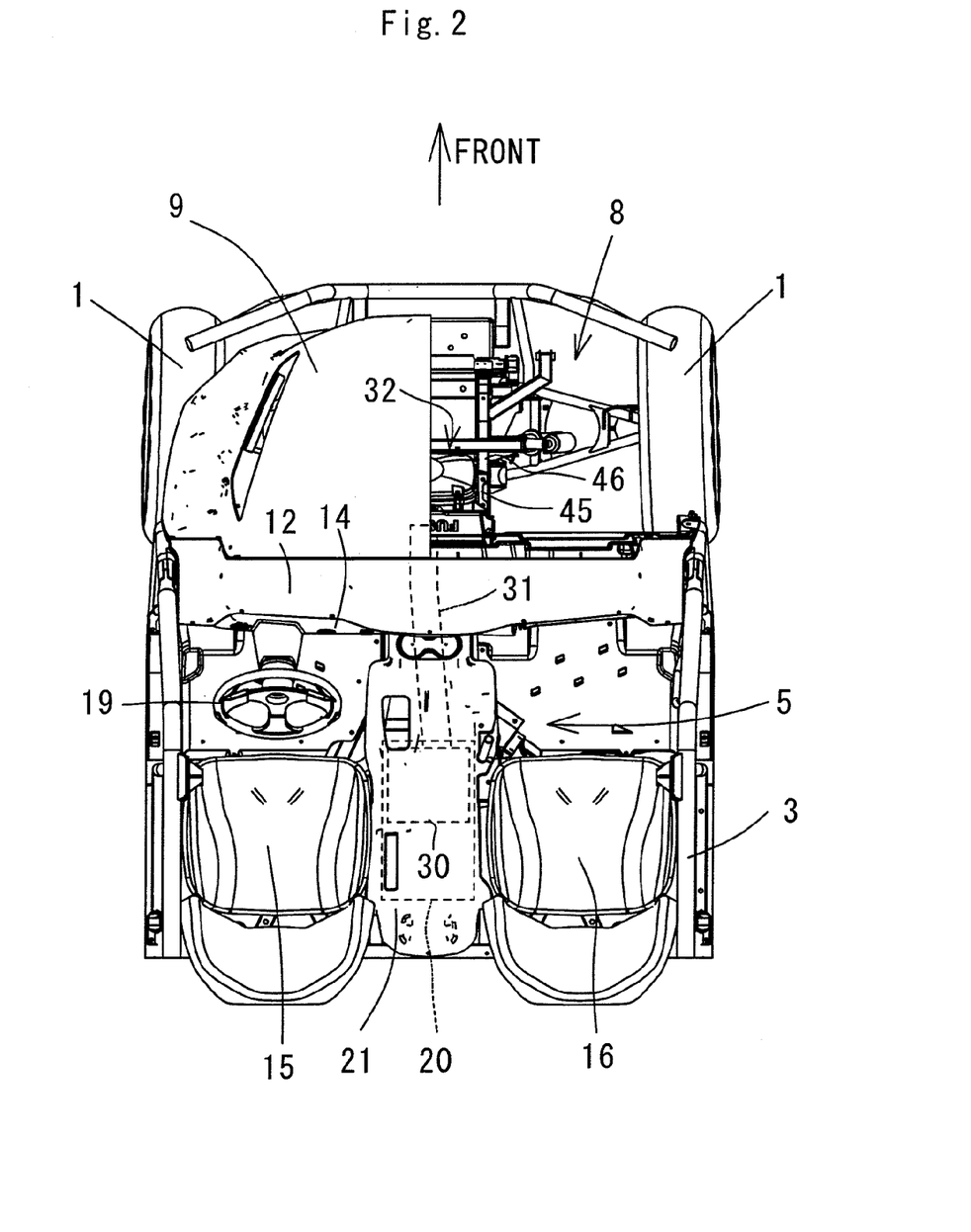
FIG. 2 is a plan view of a front half part of the utility vehicle of FIG. 1.

FIG. 2 shows a left driver's seat 15 and a right passenger's seat 16 installed in a rear part in the cabin 5. The dashboard 12, provided in a front part in the cabin 5, is formed into a housing having a wide interior space. On a rear surface of the dashboard 12, an operation panel to which various meters and switches are attached is provided, and a steering wheel 19 (for a driver) for steering the vehicle is also provided.

An engine 20 and a console box 21, covering the upper side and the right and left sides of an upper part of the engine 20, are arranged between the driver's seat 15 and the passenger's seat 16. The console box 21 extends forward in a laterally central part in the cabin 5 from a position between the driver's seat 15 and the passenger's seat 16. A front end of the console box 21 communicates with the interior of the bonnet chamber 8.

2. Configuration of Air-Intake Apparatus

In FIG. 2, an air-intake apparatus for combustion air for the engine includes an air-intake chamber 30 connected to an air-intake port of the engine 20 via a throttle body or a carburetor and arranged on the upper side of the engine 20, an air-intake duct 31 connected to an inlet of the air-intake chamber 30, the air-intake duct 31 extending forward in the console box 21 and reaching the bonnet chamber 8, and an air cleaner case 32 arranged in the bonnet chamber 8 and connected to a front end of the air-intake duct 31. The air cleaner case 32 is arranged in a rear end of the bonnet chamber 8 and in a substantially center part of the vehicle width.

Figure 3:
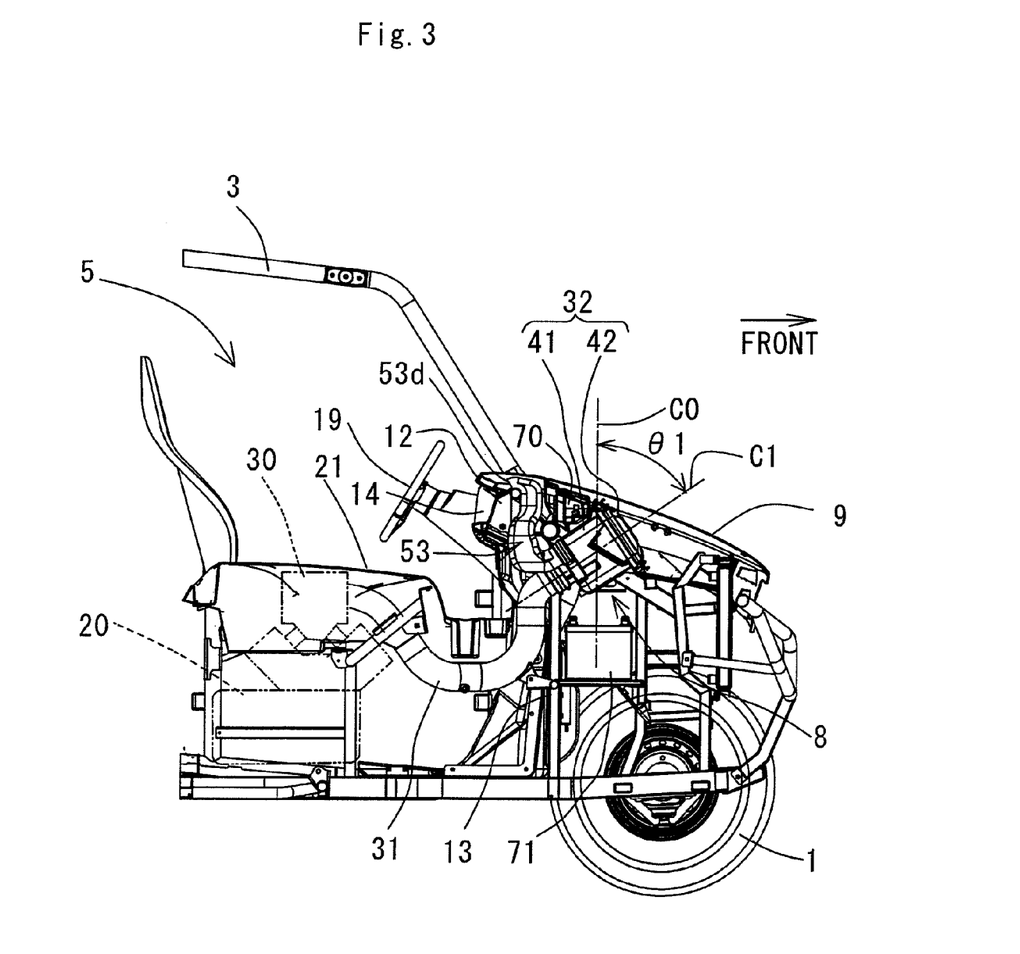
FIG. 3 is a vertical sectional view of FIG. 2.

FIG. 3 is a vertical sectional view of FIG. 2, and FIG. 3 shows the air-intake duct 31 extending forward in the console box 21 and standing upward along a rear surface of the partition plate 13. The front end of the air-intake duct 31 enters a space in a rear upper end of the bonnet chamber 8 in a state that the front end faces forwardly and upwardly (an forward-inclined state). The air cleaner case 32 is arranged at a position in the rear upper end portion of the bonnet chamber 8, that is, at a position in the vicinity of the front side of the dashboard 12.

3. Configuration of Air Cleaner Case

Figure 4:
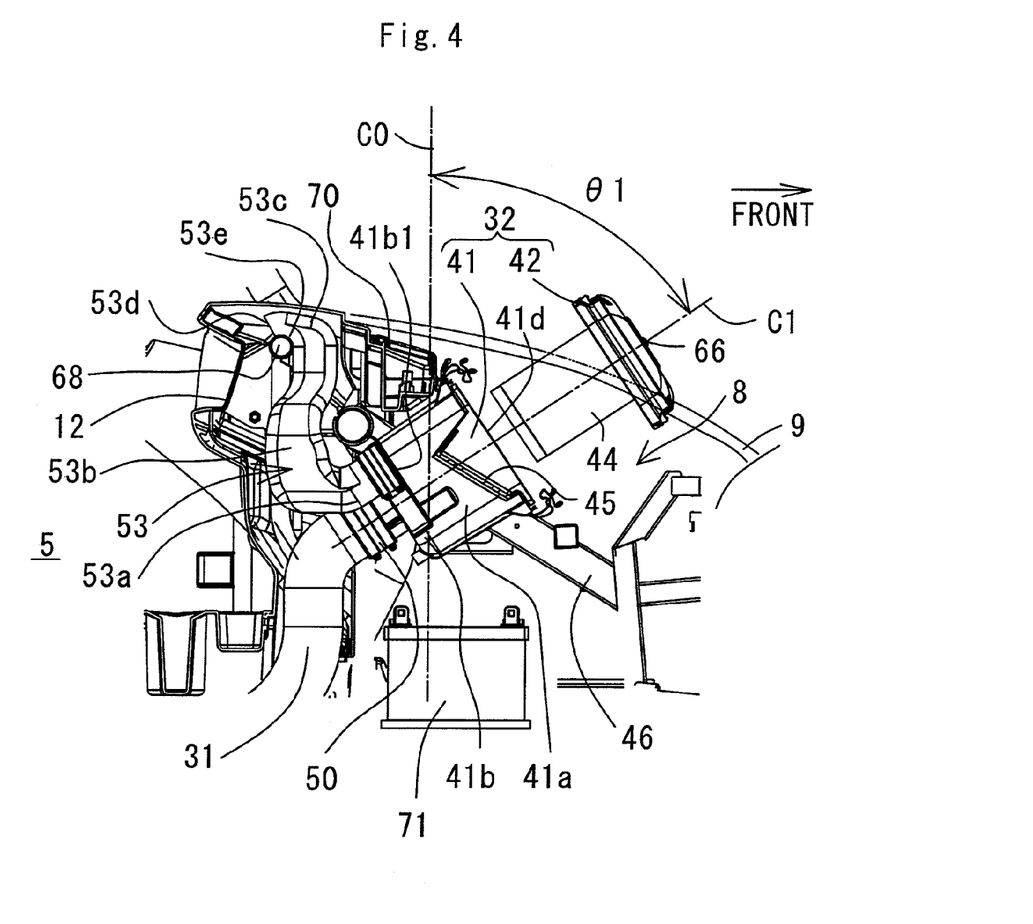
FIG. 4 is an enlarged sectional view of an air cleaner case and a snorkel of FIG. 1, and peripheries thereof.
Figure 5:
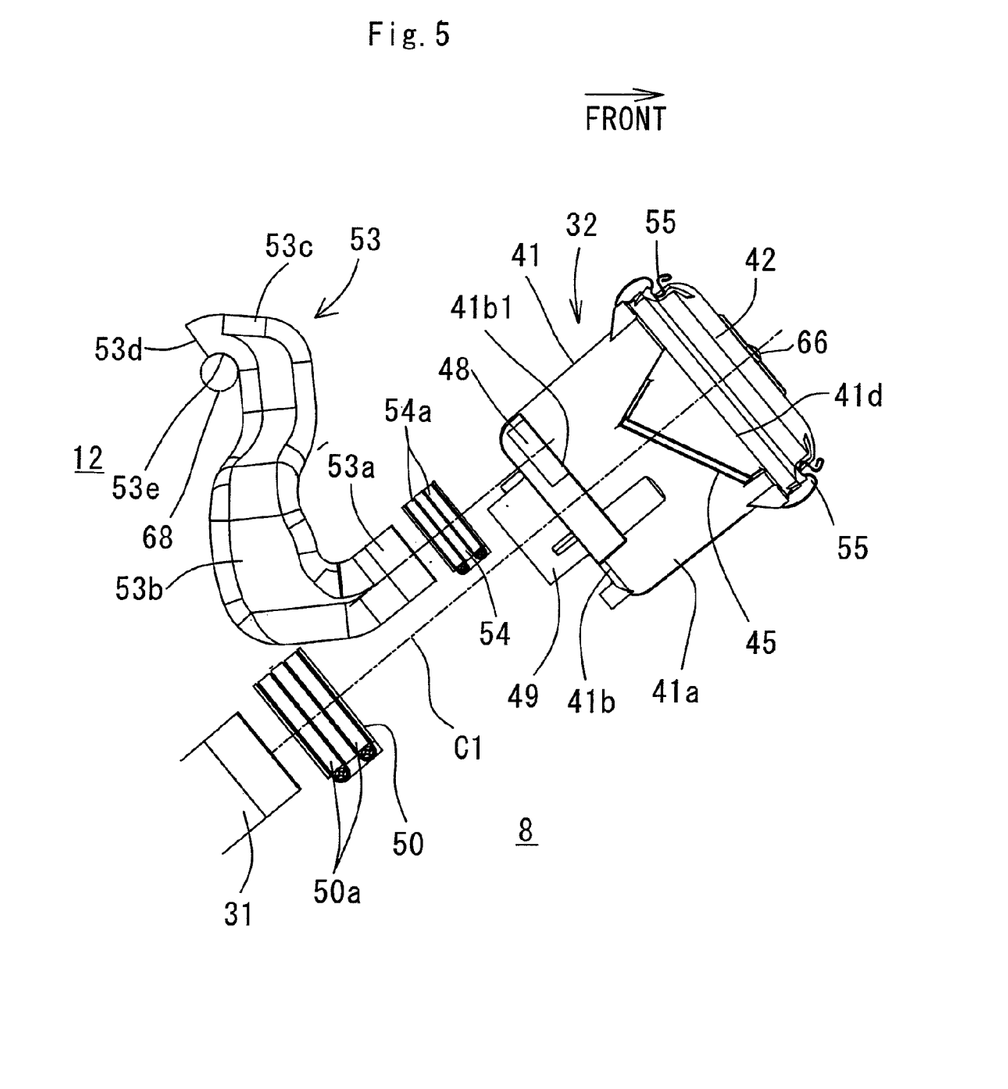
FIG. 5 is an exploded right side view of the air cleaner case and the snorkel of FIG. 1.

FIG. 4 is an enlarged sectional view of the air cleaner case 32 and a snorkel 53, and peripheries thereof, and FIG. 5 is an exploded right side view of the air cleaner case 32 and the snorkel 53 of FIG. 1. In FIG. 4, the air cleaner case 32 is provided with a case main body 41 and an upper lid 42. The case main body 41 integrally has a peripheral side wall 41a and a bottom wall 41b. The upper lid 42 closes an opening 41d of the case main body 41. The air cleaner case 32 is arranged in a forward-inclined state so that a central axis C1 of a tubular filter element 44 accommodated in the case main body 41 is inclined forward by a fixed angle $\theta 1$ (such as 50°) relative to a vertical line C0. Therefore, the opening 41d of the case main body 41 is opened toward the front upper side of the bonnet chamber 8.

Electric components or equipment (such as an ECU and a relay) 70 are arranged in a rear space of the bonnet chamber above and behind the air cleaner case 32. In other words, the electric components 70 are arranged between the bonnet 9 and the air cleaner case 32 in a forward-inclined posture. A heavy battery 71 is arranged in a space under the air cleaner case 32 in the bonnet chamber 8.

Attached pieces 45 are integrally formed on both right and left side surfaces of the peripheral side wall 41a of the case main body 41. The attached pieces 45 are fixed to a pair of right and left frame members 46 in the bonnet chamber 8. The pair of frame members 46 is inclined downward toward the front side.

In FIG. 5, the bottom wall 41b of the case main body 41 faces rearward and downward. A tubular air inlet 48 and a tubular air outlet 49 are formed in the bottom wall 41b so as to protrude rearward and downward. A bottom wall part 41b1, in which the air inlet 48 is formed, is formed at a front upper position (upper lid side position in the central axis C1 direction) of the bottom wall 41b in which the air outlet 49 is formed. The front end of the air-intake duct 31 is abutted with the air outlet 49 from the rear lower side, and the air outlet 49 and the front end of the air-intake duct 31 are connected by a joint tube 50 and a pair of fastening bands 50a. A front terminal of a lower end (an end on the air downstream side) 53a of the snorkel 53 (described later) is abutted with the air inlet 48 from the rear lower side, and the air inlet 48 and the lower end 53a of the snorkel 53 are connected by a joint tube 54 and a pair of fastening bands 54a. The upper lid 42 is detachably attached to an opening end of the case main body 41 by a plurality of clamps 55.

Figure 6:
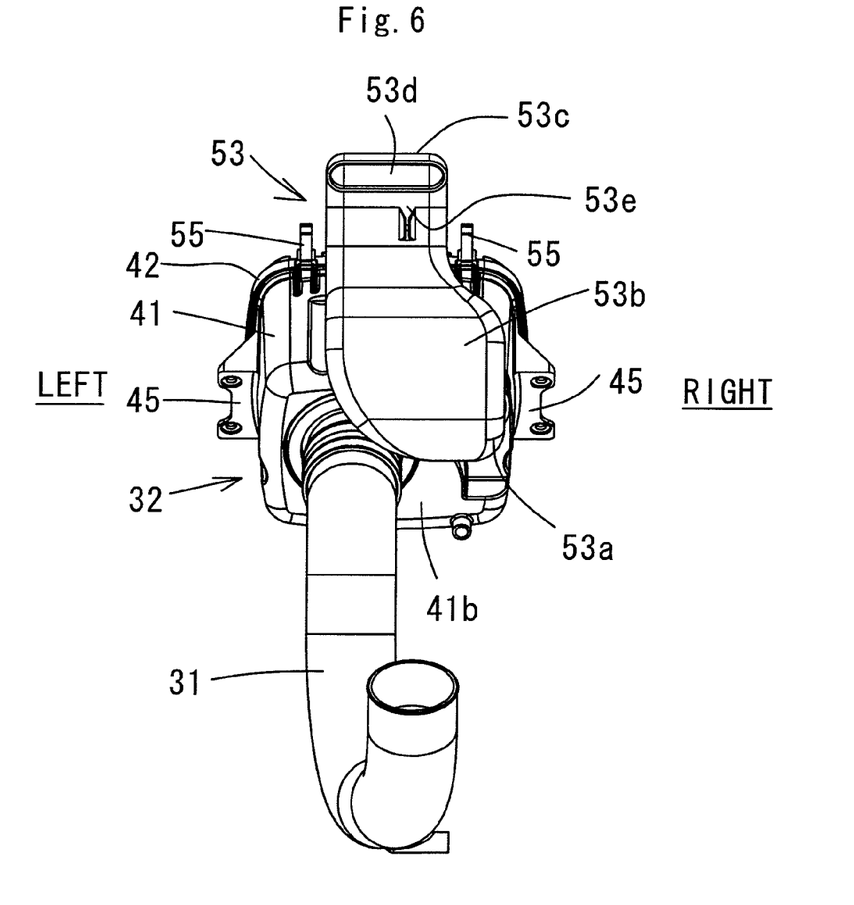
FIG. 6 is a back view of the air cleaner case and the snorkel of FIG. 1.
Figure 7:
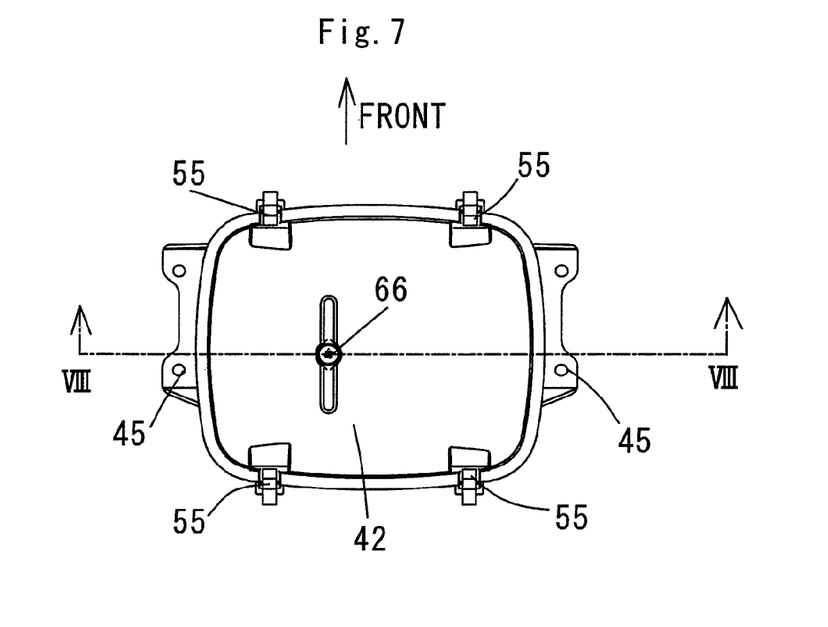
FIG. 7 is an enlarged plan view of the air cleaner case of FIG. 1.
Figure 8:
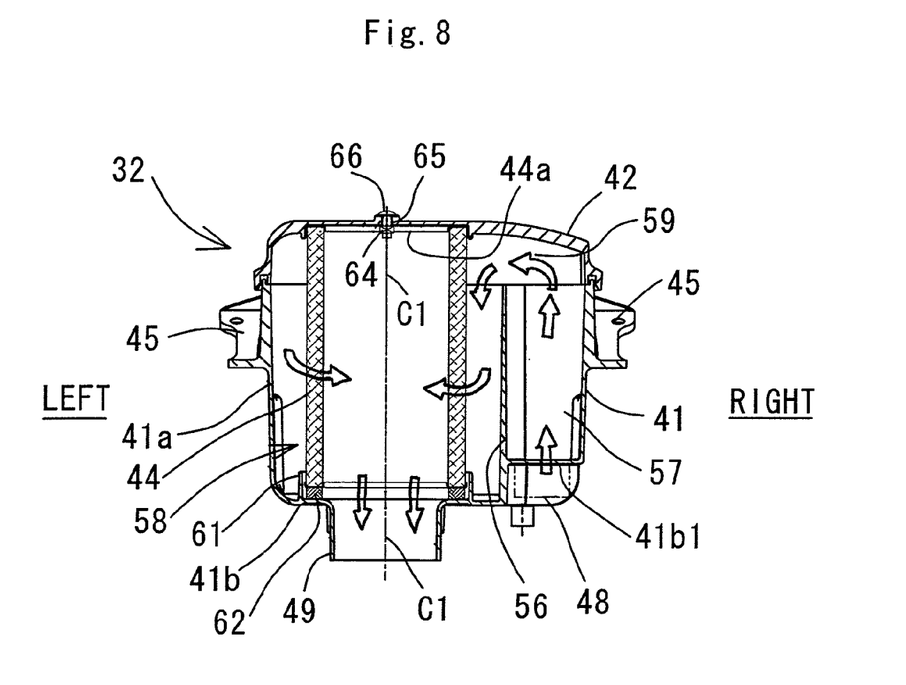
FIG. 8 is a sectional view taken along line VIII-VIII of FIG. 7.

FIG. 6 is a back view of the air cleaner case 32, FIG. 7 is a plan view of the air cleaner case 32, and FIG. 8 is a sectional view of the air cleaner case 32 taken along line VIII-VIII of FIG. 7. In FIG. 8, the interior of the air cleaner case 32 is partitioned into a right pre-processing chamber 57 and a left element chamber 58 by a partition wall 56. The chambers 57, 58 communicate with each other via a passage 59 on the upper side of the partition wall 56. The air inlet 48 is formed in the bottom wall part 41b1 of the pre-processing chamber 57, and the air outlet 49 is formed in the bottom wall 41b of the element chamber 58. An annular rib 61 for positioning a filter element 44 is formed on an upper surface in the bottom wall 41b of the element chamber 58. The annular rib 61 and the air outlet 49 are coaxially-arranged relative to each other. In other words, a central axis of the annular rib 61 coincides with a central axis of the air outlet 49 (the central axis C1 of the filter element 44). Moreover, an annular cushion member 62 made of sponge rubber or the like is arranged on the inner side of the annular rib 61. A lower end of the filter element 44, accommodated in the element chamber 58, is fitted in an inner peripheral surface of the rib 61 and is disposed on the cushion member 62.

A top plate 44a made of metal or resin is fixed to an upper end of the tubular filter element 44, and a nut 64 is fixed to the center of the top plate 44a. Meanwhile, a bolt insertion hole 65 is formed in the upper lid 42. By screwing a bolt 66 inserted into the bolt insertion hole 65 from the upper side into the nut 64, the filter element 44 is fixed to the upper lid 42. Thereby, the filter element 44 can be attached to and detached from the case main body 41 integrally with the upper lid 42.

It should be noted that the air outlet 49 is displaced on the left side relative to the center of the air cleaner case 32 in the right and left direction (vehicle width direction), and the air inlet 48 is displaced on the right side relative to the center of the air cleaner case 32 in the right and left direction.

4. Configuration of Snorkel

In FIG. 5, the lower end 53a of the snorkel 53 extends frontward and upward, and is connected to the air inlet 48 of the air cleaner case 32 as described above. An intermediate portion 53b of the snorkel 53 extends in a vertical direction. An upper end 53c of the snorkel 53 is bent rearward, and a rear terminal of the upper end 53c is open toward the rear lower side as an air taking port 53d. An arc shape attachment support portion 53e, open downward, is formed on the lower side of the upper end 53c of the snorkel 53. The attachment support portion 53e can be fitted to a round rod or a round pipe 68 arranged so as to extend in the right and left direction in the bonnet chamber 8 from the upper side.

As shown in FIGS. 3 and 4, the entire snorkel 53 of the present embodiment is arranged in the dashboard 12. Therefore, the air taking port 53d of the upper end 53c is opened in the dashboard 12.

In FIG. 6, the air taking port 53d of the snorkel 53 is formed into a flat shape elongated in the right and left direction, and the intermediate portion 53b has a horizontal section formed into a substantially rectangular shape. A horizontal section area (an air flow passage area) of a lower half part of the intermediate portion 53b is larger than a horizontal section area of an upper half part of the intermediate portion 53b.

5. Flow of Combustion Air

A flow of the combustion air will be briefly described. In FIG. 3, fresh air in the dashboard 12 is taken from the air taking port 53d of the snorkel 53 during vehicle running, and this air flows downward in the snorkel 53, and comes into the air cleaner case 32 from the air inlet 48 of the air cleaner case 32 shown in FIG. 5.

In FIG. 8, the air enters a lower end of the pre-processing chamber 57 from the air inlet 48. After mud, water, and the like are separated from the air and left in the pre-treatment chamber 57, the air flows into the element chamber 58 via the passage 59 at an upper end of the air cleaner case.

In the element chamber 58, the air is purified by passing through the filter element 44 from the outer peripheral side to the inner peripheral side. The purified air comes into the air-intake duct 31 shown in FIG. 3 from the air outlet 49 on a lower end of the air cleaner case. The air fed rearward in the air-intake duct 31 is supplied from the air-intake chamber 30 to a combustion chamber of the engine via the throttle body or the like (not shown).

6. Assembling of Air Cleaner Case

In FIG. 4, in a case where the filter element 44 is to be taken out, the bolt 66 of the upper lid 42 is loosened, and the upper lid 42 is removed from the case main body 41 at the front upper side, so that the filter element 44 can be taken out integrally with the upper lid 42.

Meanwhile, in a case where the filter element 44 is attached, the filter element 44 is attached to a back surface of the upper lid 42, so that the filter element 44 can be placed in the case main body 41 integrally with the upper lid 42. In this case, even in a state where the case main body 41 is inclined, the filter element 44 does not fall but can be reliably attached at a correct position in the case main body 41 as shown in FIG. 8.

7. Effects of the First Embodiment (1) As shown in FIGS. 3 and 4, the air cleaner case 32 is inclined so that the central axis C1 of the filter element 44 is inclined forward. Thus, a space in an upper rear part of the air cleaner case 32 can be effectively utilized for arranging the components 70 for a vehicle without disturbing maintenance of the air cleaner case 32, so that the air cleaner case 32 can be compactly arranged in the bonnet chamber 8.

(2) In the case main body 41, the central axis C1 of the filter element 44 is inclined forward relative to the vertical line C0. Thus, upon performing attachment and detachment tasks of the filter element 44, even a short person can view the interior of the air cleaner case 32 so as to easily attach and detach the filter element 44.

(3) As shown in FIGS. 1 to 3, the snorkel 53 is arranged in the dashboard 12, and the combustion air is taken in from the interior of the dashboard 12. Thus, fresh air can always be taken in, and mud, water, sand, gravel, and other foreign substances scattered by the front wheels 1 can also be prevented from entering the air cleaner case 32. Thereby, clogging of the filter element 44 in the air cleaner case 32 is reduced, so that replacement timing and maintenance timing of the filter element 44 can be extended. Contamination by mud, sand, and the like, and damage by gravel of an outer peripheral surface of the air cleaner case 32 can also be reduced.

(4) In FIG. 5, in a case where the snorkel 53 and the air-intake duct 31 are connected to the case main body 41, the front end of the air-intake duct 31 facing front and upward and the lower end 53a of the snorkel 53 facing front and upward are connected to the bottom wall 41b and the bottom wall part 41b1 of the case main body 41 in a forward-inclined posture. Thus, a connection task for the both can be easily performed.

(5) The bottom wall part 41b1 in which the air inlet 48 of the case main body 41 is formed is depressed toward the front upper side from the bottom wall 41b in which the air outlet 49 is formed, in the central axis C1 direction. Thus, a connection position of the air-intake duct 31 to the air cleaner case 32 and a connection position of the snorkel 53 to the air cleaner case 32 are displaced from each other in relation to the central axis direction. Thereby, connection points of the air-intake duct 31 and the snorkel 53 to the air cleaner case 32 do not interfere with each other, so that the connection task can be easily performed.

(6) The arc shape attachment support portion 53e is formed on the lower side of the upper end 53c of the snorkel 53. Thus, in a case where the snorkel 53 and the air inlet 48 of the case main body 41 are connected, firstly in FIG. 5, the arc shape attachment support portion 53e of the upper end 53c of the snorkel 53 is engaged with the round rod or round pipe 68 of a vehicle body frame in the bonnet chamber 8, and thereby the snorkel 53 is hung down from the round rod or round pipe 68. Then, in this state, a connection part of the lower end 53a of the snorkel 53 and the air inlet 48 of the air cleaner case 32 are connected. Thereby, even when an operator does not support the snorkel 53 with his/her hand, the connection part of the lower end 53a of the snorkel 53 and the air inlet 48 can be easily and precisely matched and connected.

(7) The battery 71 is arranged under the air cleaner case 32. Thus, a position of the battery 71 can be lowered, so that the center of gravity of the vehicle itself can be lowered and hence stabilized.

(8) The air taking port 53d of the snorkel 53 is formed in the upper end 53c of the snorkel 53. Thus, a position of the air taking port 53d is away from the ground. Thereby, a function of preventing mud and the like from entering can be more effectively realized.

Figure 9:
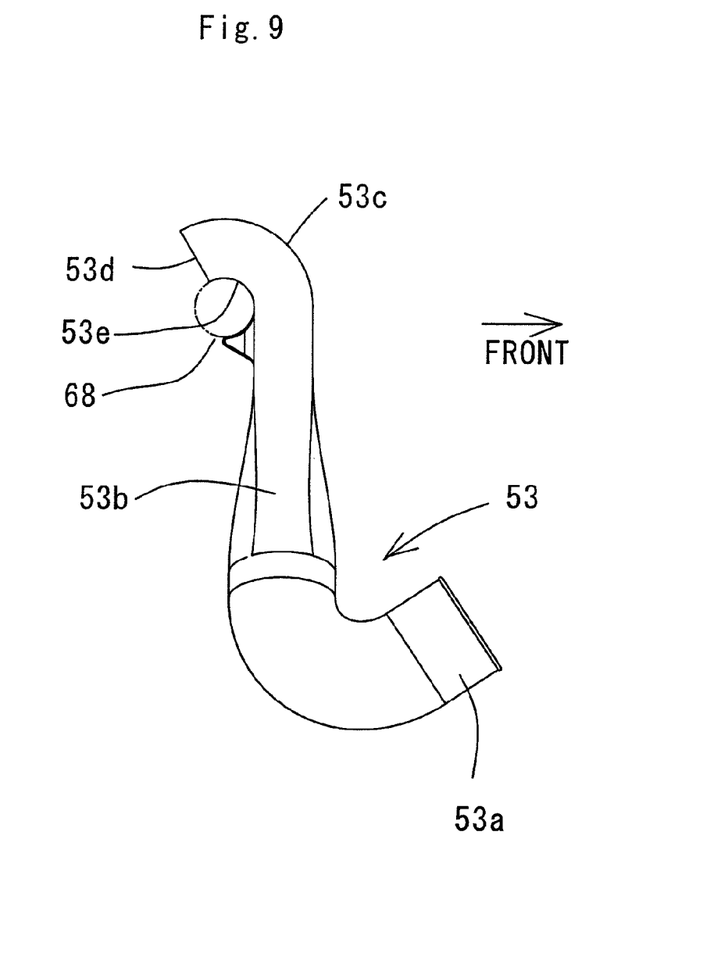
FIG. 9 is a left side view showing a modified example of the snorkel.

8. Other Embodiments (1) FIG. 9 shows a modified example of the snorkel 53. The intermediate portion 53b of the snorkel 53 of the first embodiment has a rectangular section, whereas the intermediate portion 53b has a circular section in the modified example. Other structures of the modified example are the same as in the first embodiment, and the same parts are denoted by the same reference characters.

(2) In the utility vehicle of FIG. 1, a position of the engine 20 in the front and rear direction substantially corresponds to positions of the driver's seat 15 and the passenger's seat 16. However, the present invention can be applied to a utility vehicle in which the engine 20 is arranged on the rear side of the driver's seat 15 and the passenger's seat 16.

(3) The present invention can be applied to a utility vehicle for four passengers having a loading platform. The present invention is not limited to a four-wheeled utility vehicle but can also be applied to a vehicle having six or more wheels.

(4) The present invention is not limited to the above embodiments but variously modified examples can be adopted within a range not departing from the claims.

The invention claimed is:

1. A utility vehicle, comprising:
   a bonnet chamber positioned in a front part of the vehicle and covered with a bonnet;
   a partition plate and a dashboard positioned at a rear side of the bonnet chamber;
   a V-type engine arranged at a rear position relative to the bonnet chamber, the V-type engine including a front cylinder and a rear cylinder; and
   an air-intake apparatus for supplying combustion air to the engine, wherein the air-intake apparatus includes:
   an air-intake chamber arranged above a space between the front cylinder and the rear cylinder of the V-type engine;
   an air-intake duct connected to an air-intake portion of the V-type engine, the air-intake duct extending forward from the air intake-chamber, first, curving downward, then, extending upward along a rear surface of the partition plate, and last of all, entering a space in a rear upper portion of the bonnet chamber such that a front end of the air-intake duct is disposed in the upper end portion of the bonnet chamber; and
   an air cleaner case connected to the front end of the air-intake duct, the air cleaner case accommodating a tubular filter element, the air cleaner case being arranged so as to be inclined in the bonnet chamber so that a central axis of the filter element is inclined forward.

2. The utility vehicle according to claim 1, wherein the air cleaner case has a case main body and an upper lid, the case main body having a bottom wall and a peripheral side wall, and
   an air inlet and an air outlet are formed in the bottom wall of the case main body.

3. The utility vehicle according to claim 1, wherein the air cleaner case has a case main body and an upper lid, the case main body having a bottom wall and a peripheral side wall, and
   the tubular filter element is fixed to the upper lid and attached to the case main body integrally with the upper lid.

4. The utility vehicle according to claim 1, further comprising an electric component arranged outside the air cleaner case, the electric component being located near the air cleaner case and above and behind the air cleaner case.

5. The utility vehicle according to claim 1, wherein a battery is arranged under the air cleaner case.

6. The utility vehicle according to claim 2, wherein a snorkel extending upward with an upper end thereof opened downward is detachably connected to the air inlet formed in the bottom wall of the case main body.

7. The utility vehicle according to claim 6, wherein the snorkel is opened in the dashboard above the partition plate.

8. The utility vehicle according to claim 6, wherein the snorkel is provided with a substantially arc shape attachment support portion on a lower surface of an upper end thereof.

* * * * *